(12) United States Patent
Doudement

(10) Patent No.: US 8,109,756 B2
(45) Date of Patent: Feb. 7, 2012

(54) BLOW-MOULDING INSTALLATION FOR FABRICATING A CONTAINER FROM A BLANK

(75) Inventor: Christophe Doudement, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 230 days.

(21) Appl. No.: 12/645,878

(22) Filed: Dec. 23, 2009

(65) Prior Publication Data
US 2010/0159058 A1 Jun. 24, 2010

(30) Foreign Application Priority Data

Dec. 24, 2008 (FR) ...................................... 08 59058

(51) Int. Cl.
*B29C 49/58* (2006.01)
(52) U.S. Cl. ...................................................... 425/535
(58) Field of Classification Search .................. 425/535; 65/300
See application file for complete search history.

(56) References Cited

U.S. PATENT DOCUMENTS 6,464,486 B1 10/2002 Barray et al.
7,165,956 B2 1/2007 Santais et al.

FOREIGN PATENT DOCUMENTS

| FR | 2 764 544 | | 12/1998 |
|----|-----------|---|---------|
| FR | 2 790 704 | | 9/2000 |
| FR | 2 848 905 | | 6/2004 |
| FR | 2 912 678 | | 8/2008 |
| GB | 2114502 A | * | 8/1983 |
| JP | 09-123262 | | 5/1997 |

OTHER PUBLICATIONS

French Search Report dated Sep. 3, 2009, from corresponding French application.

* cited by examiner

*Primary Examiner* — Robert B Davis
(74) *Attorney, Agent, or Firm* — Young & Thompson

(57) ABSTRACT

A blow-moulding installation (10) for fabricating a container from a blank (12), includes a mould (20) which bounds a moulding cavity (18) in which a blank (12) is arranged, emerging through an opening of the mould (20), a tubular blowing nozzle (28) slidingly mounted between a raised rest position, and a lowered blowing position, in which the nozzle (28) is suitable for conveying a pressurized fluid into the blank (12), at least one element (46*a*) for locking the nozzle (28) in its lowered blowing position, the locking element (46*a*) being such as a lock (46*a*) including a strike (48*a*) and a movable bolt (58*a*) which is elastically returned to a locking position in the strike.

12 Claims, 6 Drawing Sheets

BLOW-MOULDING INSTALLATION FOR FABRICATING A CONTAINER FROM A BLANK

The invention relates to a blow-moulding installation for fabricating a container from a blank.

The invention relates more particularly to a blow-moulding installation for the fabrication of a container from a blank, the installation comprising:
- a mould which bounds an internal moulding cavity in which the blank can be arranged in such a way that an upper neck to of the blank emerges from the cavity of the mould,
- a blowing nozzle which is movably mounted between a rest position in which the nozzle is arranged above the neck of the blank, and a blowing position in which the nozzle capping the mould is suitable for conveying a pressurized fluid into the blank, and
- a locking device which comprises at least one means for locking the nozzle and the mould in the said blowing position, the locking means comprising at least one female element carried by the mould and at least one male locking element which, joined to the nozzle, is movably mounted between:
  - a locking position in which the male element cooperates with the female element to lock the nozzle to the mould in its blowing position, and
  - an unlocking position in which the male element is released from the female element to allow the nozzle to return to its rest position.

Several types of blow-moulding or drawing-blow-moulding installations are known for fabricating a container from a blank, in particular of the blow-moulding installation type comprising a nozzle called a "bell nozzle".

Document FR-A-2 764 544 describes and shows such a blow-moulding installation with a bell nozzle, for fabricating a container from a blank.

The term "blank" not only relates to a preform, but also an intermediate container which has undergone one or more previous blow-mouldings.

The final hollow container, such as a bottle, jar, etc., is obtained from a blank of thermoplastic material, in particular of PET (polyethylene terephthalate).

In general, the blank is previously softened by heating by a furnace provided for the purpose, and is then arranged in a moulding cavity bounded by the mould of the blow-moulding installation, so that the neck of the blank emerges from the moulding cavity of the mould.

The movable nozzle is then driven to travel vertically downwards from its raised rest position, to its lowered blowing position, in which the bell of the nozzle caps the neck of the blank and the annular sealing lip of the bell bears against the upper horizontal face of the mould.

A fluid, generally air under high pressure, is injected into the blank by means of the nozzle, in order to blow the blank and to force the material against the wall of the moulding cavity of the mould, to obtain the container.

The bell of the nozzle is forced against the upper face of the mould with a force higher than the repulsion force generated by the pressure of the blowing fluid, so that the blank is hermetically isolated and only communicates with the bell of the nozzle.

For this purpose, the mould is carried by a first support and the nozzle is carried by a second movable support, for example a support arm.

These supports are generally robust and heavy, in order to apply a sufficiently strong force against one another to force the bell of the nozzle against the mould in its blowing position.

The inertia generated by the movement of such supports limits the production rate of the installation, that is the cycle time required to fabricate a container.

To overcome this problem, document FR-A-2 848 905 describes a blow-moulding installation with a bell nozzle, which comprises means for locking by mutual attraction of the nozzle and the mould.

According to an exemplary embodiment of this installation, the locking means comprise at least one female cavity, bounded to by a hooking bar which extends from the upper face of the mould.

Complementarily, the locking means comprise a male element having the shape of a curved finger which is pivotingly mounted on the nozzle, and which is suitable for being controlled between an unlocking position in which the nozzle is free to slide vertically, and a locking position in which a concave internal portion of the finger is engaged under the bar, in order to apply a continuous force to bring the nozzle towards the mould and lock them together.

These locking means are effective, but they require a high input of driving power.

This is because a pressure must be applied to the finger throughout the blowing time of the container, so that the finger opposes the force of repulsion of the nozzle and the mould, generated by the pressure of the blowing fluid.

Moreover, such joining means require successfully controlling the movement of the finger a first time, when the nozzle has reached its lowered blowing position, to drive the finger from its unlocking position to its locking position in order to lock the nozzle and the mould together, and a second time, conversely to drive the finger from its locking position to its unlocking position in order to unlock the nozzle and release the mould so as to extract the container produced by the blow-moulding from the blank.

In fact, this double control requires a time interval that substantially lengthens the cycle time for fabricating a container, to the detriment of the production rate and therefore of costs.

The invention proposes to solve these problems in particular, by means of a blow-moulding installation which comprises means for automatically locking the nozzle to the mould, which are reliable, simple and rapid, and of which the operation also requires little energy.

For this purpose, the invention proposes a blow-moulding to installation of the type described above, characterized in that the locking means comprises a first means for returning the male element to its locking position, and in that the male element comprises an actuating surface which, during the movement of the nozzle towards its blowing position, cooperates with a matching is control surface joined to the mould in order to mechanically force the male element towards its locking position against the first return means, the said male element being returned automatically to its locking position when the nozzle occupies its blowing position.

According to other features of the invention:
- the locking means comprises an actuating means which is suitable for driving the male element from its locking position to its unlocking position, against the first return means;
- the locking means is equipped with a lever which extends roughly vertically and which comprises:

a central section which is pivotingly mounted on the nozzle about a horizontal axis perpendicular to the axis of movement of the nozzle, a lower section at the end of which the male element is arranged, an upper section on which the said actuating means acts to pivot the lever, in order to drive the male element from its locking position to its unlocking position;

the first return means of the male element comprises a first spring which is inserted between the nozzle and the lower section of the lever, in order to apply an elastic return force to the lever to elastically return the male element to its locking position;

the actuating means is a piston which, under the effect of a pressurized fluid, slides along a horizontal axis C perpendicular to the pivoting axis B of the lever between:

a first free position in which the piston is retracted, so that the male element is forced into its locking position by the first return means, and a second working position in which the piston applies a driving force to the lever, so that the male element is driven into its unlocking position by the pivoting of the lever against the first return means;

the nozzle comprises a feed duct which extends from the sleeve of the piston, to the well of the nozzle, so that the pressurized fluid for causing the piston to slide consists of the pressurized fluid which is conveyed by the nozzle for blowing the blank;

the piston slides from its first rest position towards its second working position when the pressure of the fluid in the sleeve is higher than a threshold pressure value and the said threshold pressure value is reached when, the blowing of the blank being completed, the pressurized fluid conveyed into the nozzle causes an overpressure therein;

to supply the actuating means with pressurized fluid, the nozzle comprises a pressurized fluid feed duct, which extends from an inlet orifice arranged in a peripheral face of the nozzle to a sleeve, which is bounded by the nozzle and in which the piston is slidingly mounted;

the upper section of the lever bounds an opening through which a horizontal coupling extends, whereof a first end is connected to the inlet orifice of the feed duct, and a second opposite end is suitable for being connected to an external source of pressurized fluid;

the blow-moulding installation comprises an insert which is vertically and slidingly mounted in the nozzle between a low position towards which the insert is elastically returned by a return means, and a high position in which the insert bears against the neck of the blank, against the return means, to prevent the neck from being arranged across the opening of the mould;

the combination formed by the insert and the return means constitutes a means of elastic return of the nozzle from its lowered blowing position to its raised rest position;

the installation comprises a vertical median plane of symmetry passing through the vertical axis of movement of the nozzle, so that the installation comprises at least two locking means which are arranged symmetrically about the said plane.

Other features and advantages of the invention will appear from a reading of the detailed description that follows for an understanding of which reference can be made to the appended drawings in which.

The longitudinal, vertical and transverse orientations are to used in a non-limiting manner according to the three-plane datum-system L, V, T shown in the figures.

The terms horizontal and vertical are also adopted, without reference to the Earth's gravity, the terms left and right with reference to the left-hand part and the right-hand part of the is figures respectively, and the terms upper and lower with reference to the vertical direction of the index mark L, V, T.

Figure 1:
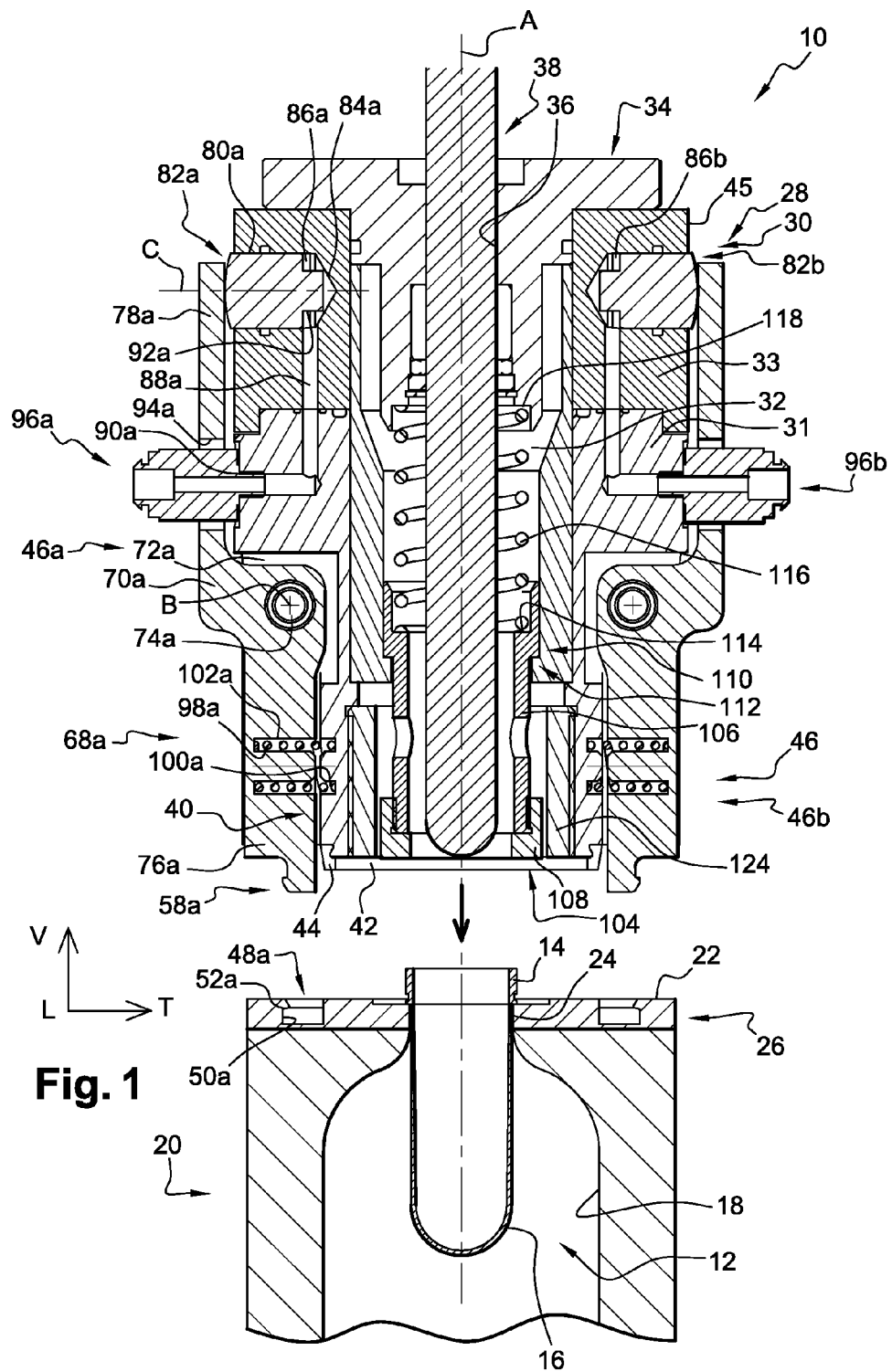
FIG. 1 shows a cross section along a vertical axis, partially illustrating an installation for blowing a blank, which shows, in the raised rest position, a nozzle equipped with a locking device according to the invention comprising first and second locks for locking the nozzle and the mould.

FIG. 1 shows a drawing-blow-moulding installation 10 for fabricating a container from a blank 12 of thermoplastic material, for example a PET (polyethylene terephthalate).

In a non-limiting manner, the blank 12 may be a preform, that is an intermediate container previously shaped in another mould. However, it is customary to use the terms "blank" and "preform" as synonymous.

The blow-moulding installation 10 shown in the figures has a general symmetry of design about a plane of symmetry passing through the median vertical axis A and through the centre of the blow-moulding installation 10.

The identical elements of the blow-moulding installation 10 are denoted by the same reference with subscripts "a" or "b".

The blank 12 comprises an upper annular neck 14, or mouth, and a lower body 16 extending vertically along the vertical axis A in an internal moulding cavity 18 bounded by a mould 20 (shown partially in the figures).

The moulding cavity 18 here is bottle shaped and terminates vertically upwards in an upper horizontal face 22 of the mould 20 via an opening 24.

Preferably, the upper face 22 of the mould 20 consists of a plate 26 added on to the top of the mould 20.

The added plate 26 consists of two half-plates for opening the two shells of the mould 20 of the "wallet" type, for extracting the bottle after blow-moulding.

Advantageously, the preparation of the plate 26 and the mould 20 in two joined but separate parts serves to make each of them from a given material. The plate 26 is preferably made from a stronger material to limit the wear of the upper face 22.

However, in a non-limiting manner, the plate 26 can be made from the same material, in a single piece, with the mould 20.

After having been heated, the blank 12 is conveyed directly above the opening 24 of the mould 20 and is then introduced into the mould 20 here by introduction vertically above the opening 24.

As FIG. 1 shows, after the introduction of the blank 12 into the mould 20, the neck 14 of the blank 12 rests vertically on the upper face 22 of the mould 20, so that the neck 14 emerges upwardly from the opening 24 of the mould 20, that is projecting from the horizontal plane of the upper face 22.

The blow-moulding installation 10 comprises a blowing nozzle 28 for injecting a fluid, here pressurized air, into the blank 12 in order to blow it and convert it into a hollow container, for example a bottle here.

The nozzle 28 comprises a substantially tubular body 30 extending vertically along the axis A and which circumferentially bounds a cylindrical well 32 about the axis A.

The nozzle 28 comprises an upper plug 34 arranged at an upper end of the well 32 and which bounds an orifice 36 about the axis A, for the passage of a vertical drawing rod 38.

The drawing rod 38 is mounted vertically and movably from bottom to top in the well 32 of the nozzle 28, between a high rest position shown in FIG. 1, in which the drawing rod 38 extends into the well 32 of the nozzle 28, and a low drawing position (not shown) in which the free end of the drawing rod 38 penetrating via the neck 14, extends vertically into the blank 12 and the mould 20, in order to bear against the bottom of the blank 12 to draw the blank 12 and facilitate the formation of the container by blow-moulding.

The drawing rod 38 is driven for example in vertical motion by a cylinder (not shown).

Thus, the drawing rod 38 serves to mechanically draw the body 16 of the blank 12 at the same time that the latter is deformed by blow-moulding.

The arrangement and operation of such a blowing nozzle are described for example in document FR-A-2 764 544, to which reference can be made for further details.

According to another aspect, the well 32 bounded by the body 30 of the nozzle 28 shapes, at its vertical lower end, a bell 40 which extends circumferentially about the axis A.

The bell 40 comprises a lower blowing orifice 42 which is bounded by sealing means, such as an annular sealing lip 44.

Preferably, the lip 44 here is an annular seal, for example made from elastomer, which is attached to a lower free end of the bell 40 by matching shapes.

Figure 3:
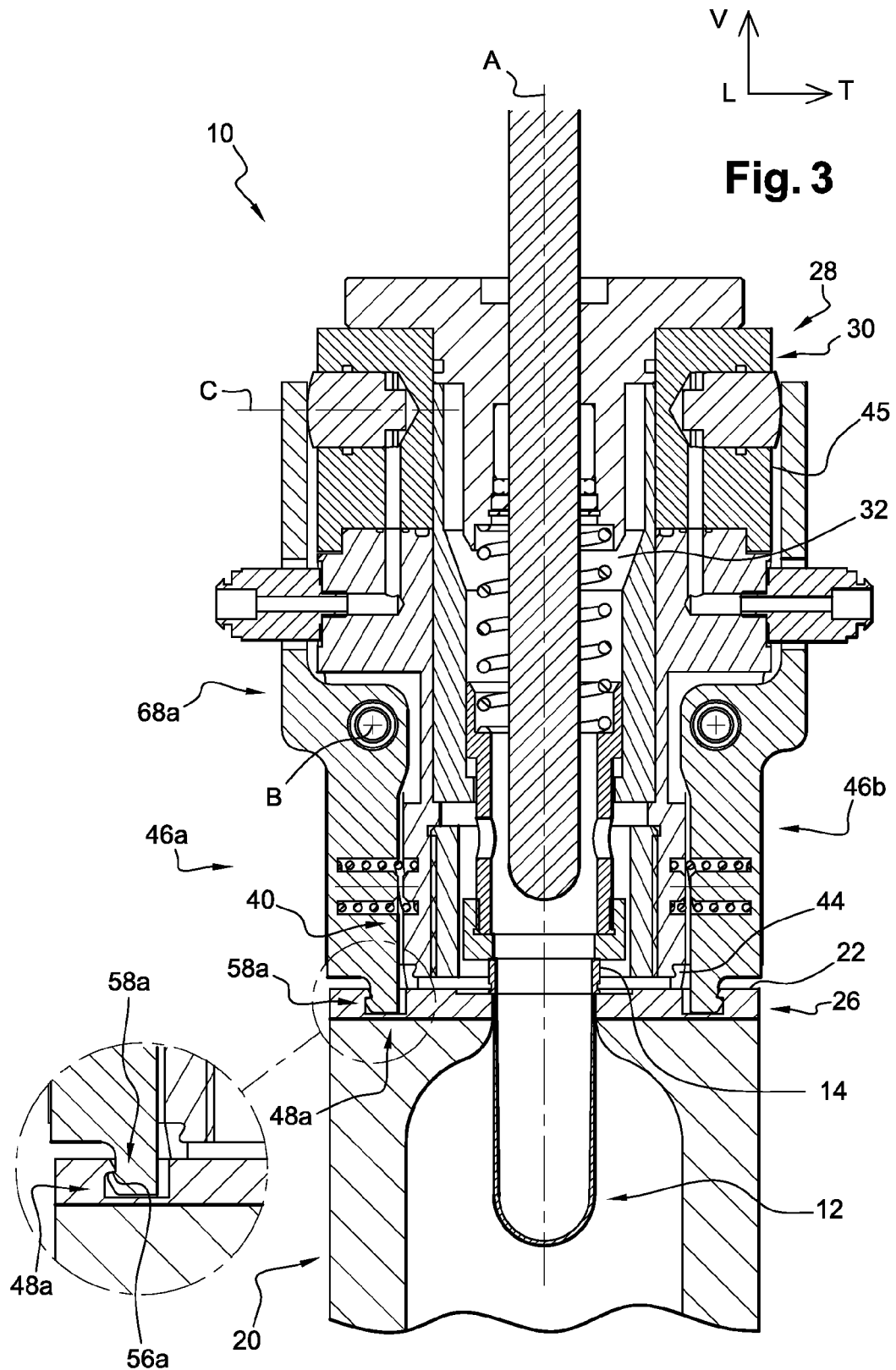
FIG. 3 is a similar view to that of FIG. 1, showing the nozzle of FIG. 1 in its lowered blowing position and the bolt of each lock in a locking position of the nozzle in the strike associated with the mould.

The nozzle 28 is mounted movably along the vertical axis A between a raised rest position, shown in FIG. 1, in which the bell 40 is arranged directly above, here vertically above, the neck 14 of the blank 12, and a lowered blowing position, shown in FIG. 3, in which the bell 40 caps the neck 14 of the blank 12.

When the nozzle 28 occupies its lowered blowing position, the annular sealing lip 44 of the bell 40 is vertically loaded downwards in order to bear against the upper face 22 of the upper plate 26 of the mould 20 and thereby to provide a seal to convey the pressurized air into the blank 12 in order to blow the blank 12.

For this purpose, the body 30 of the nozzle 28 bounds a blowing duct (not shown) which extends from an air inlet orifice (not shown) arranged in a peripheral face 45 of the body 30 of the nozzle 28, to an air outlet orifice (not shown) opening into the well 32, or the bell 40, of the nozzle 28, in order to feed pressurized air to the bell 40.

The blow-moulding installation 10 is equipped with a to locking device 46 comprising at least a first locking means 46a for the automatic locking of the nozzle 28 to the mould 20, in its lowered blowing position.

The first locking means 46a, called first lock by analogy, comprises a first female element 48a forming a recess and which is preferably made in the upper plate 26 of the mould 20, the said first female element also being called locking strike 48a below.

Figure 5:
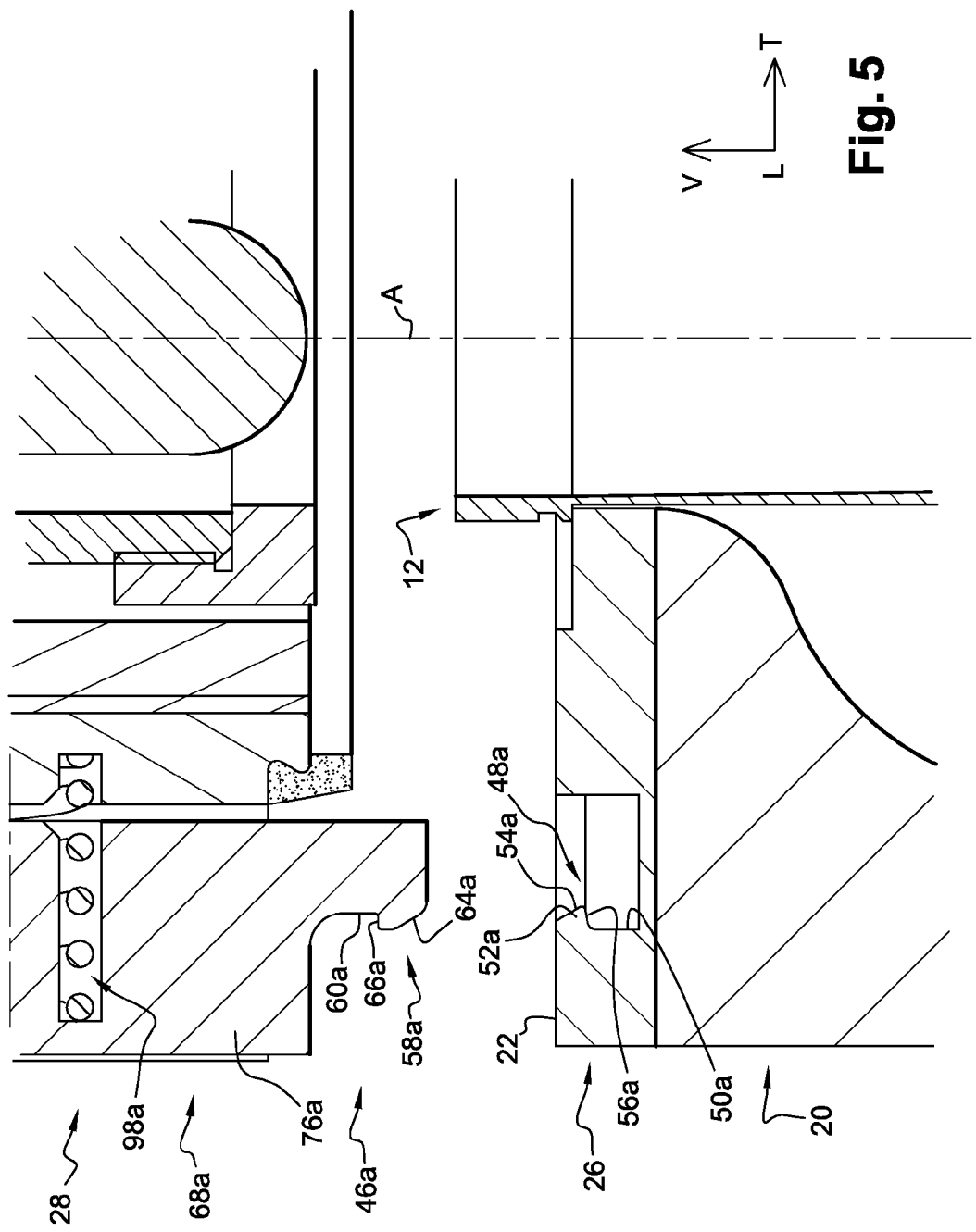
FIG. 5 is a detailed view of FIG. 1, showing the strike and the bolt of the first lock of FIG. 1.

For the following description, reference can be made advantageously to FIG. 5, which shows details of the first locking means 46a of the locking device 46.

The strike 48a has a roughly rectangular cross section, opened vertically upwards, and it comprises a vertical left inside wall 50a.

Moreover, the strike 48a is vertically bounded upwards by a locking detent 52a which extends roughly horizontally and transversally towards the axis A from the vertical inside wall 50a of the strike 48a, that is from left to right in FIG. 5.

The locking detent 52a is bounded by a control surface 54a inclined slopingly towards the interior of the strike 48a, having the shape of a ramp, and by a lower locking face 56a which extends horizontally facing the bottom of the strike 48a.

Complementarily, the first locking means, or first lock 46a, comprises a male element 58a which has a shape matching that of the first female element forming the associated first strike 48a, the said male element also being called locking bolt 58a below.

The bolt 58a is bounded by an actuating surface 64a, having the shape of a lower bevel 64a, intended to cooperate with the control surface 54a of the detent 52a of the first strike 48a, and by a horizontal upper locking face 66a which is intended to cooperate with the matching locking face 56a of the detent 52a of the first strike 48a.

The term bevel 64a denotes an oblique surface which is to intended to eliminate a sharp edge. This oblique surface is generally planar, but it may also have a convex, concave or spherical shape.

The bolt 58a extends horizontally, from right to left in FIG. 5, from a lower free end of a first lever 68a.

The bolt 58a is mounted movably on the nozzle 28, via the associated lever 68a respectively between a locking position and an unlocking position.

When the bolt 58a occupies its locking position, shown in FIG. 3, the bolt 58a is engaged in the first strike 48a, so that the horizontal upper locking face 66a of the bolt 58a bears vertically upward against the locking face 56a of the detent 52a of the first strike 48a, to oppose vertical upward sliding of the nozzle 28, and thereby to lock the nozzle 28 in its lowered blowing position, in which the nozzle 28 cooperates tightly with the mould 20.

Figure 4:
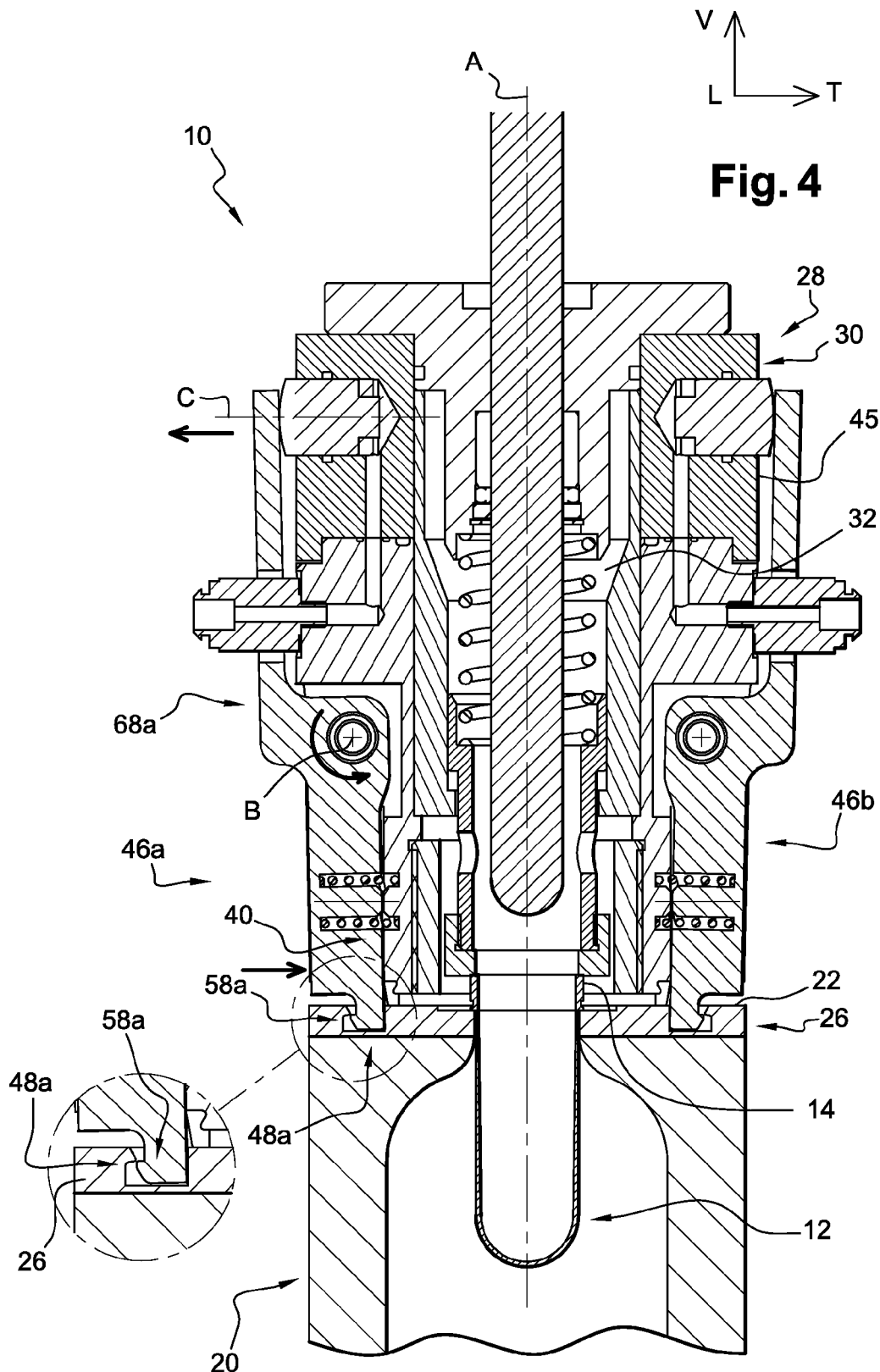
FIG. 4 is a similar view to that of FIG. 1, showing the nozzle of FIG. 1 in its lowered blowing position, and the bolt of each lock in a nozzle unlocking position.

When the bolt 58a occupies its unlocking position, shown in FIG. 4, the bolt 58a is released from the associated strike 48a to allow the vertical upward sliding of the nozzle 28 towards its raised rest position.

The first lever 68a extends roughly vertically along the peripheral face 45 of the body 30 of the nozzle 28.

The first lever 68a comprises a central section 70a which is pivotingly mounted on a shaft 74a of the body 30 of the nozzle 28 about a longitudinal horizontal axis B which is perpendicular to the vertical axis A of movement of the nozzle 28.

For this purpose, the body 30 of the nozzle 28 bounds a lateral transversally opening slot 72a, in which the shaft 74a extends longitudinally along the pivoting axis B.

Furthermore, the first lever 68a comprises a lower section 76a at the lower end of which the bolt 58a is arranged.

Finally, the first lever 68a comprises an upper section 78a on which an actuating means acts, applying a pivoting driving force from the first lever 68a, in order to drive the bolt 58a in movement by a lever effect.

The actuating means, which is associated with the first locking lock 46a, is a first piston 82a which is mounted slidingly in a blind sleeve 80a.

The sleeve 80a extends into the body 30 of the nozzle 28, along a transverse axis C, perpendicular to the pivoting axis of the first lever 68a.

The sleeve 80a terminates transversally in the peripheral face 45 of the body 30 of the nozzle 28, facing the upper section 78a of the first lever 68a.

Moreover, the blind sleeve 80a is transversally bounded by a bottom 84a, so that the bottom 84a and a rear face of the piston 82a together bound a chamber 86a having a variable geometry.

Complementarily, a fluid feed duct 88a, here for feeding pressurized air at 7 bar, extends into the body 30 of the nozzle 28.

The feed duct 88a, roughly "L" shaped, comprises a first transverse section which terminates in the vertical peripheral face 45 of the body 30 of the nozzle 28 via an inlet orifice 90a, and a second vertical section which terminates in the chamber 86a via an outlet orifice 92a.

In order to facilitate the machining of the feed duct 88a, the body 30 of the nozzle 28 is made in two parts, an upper part 33 which is fixed and fitted on top of a lower part 31 of the body 30.

As FIG. 1 shows, the inlet orifice 90a is arranged vertically below the first piston 82a.

The upper section 78a of the first lever 68a bounds an opening 94a through which a horizontal coupling 96a extends, whereof a first end is connected to the inlet orifice 90a, and a second opposite end is suitable for being connected to an external source of pressurized air (not shown), for example by to means of a flexible line (not shown).

Figure 2:
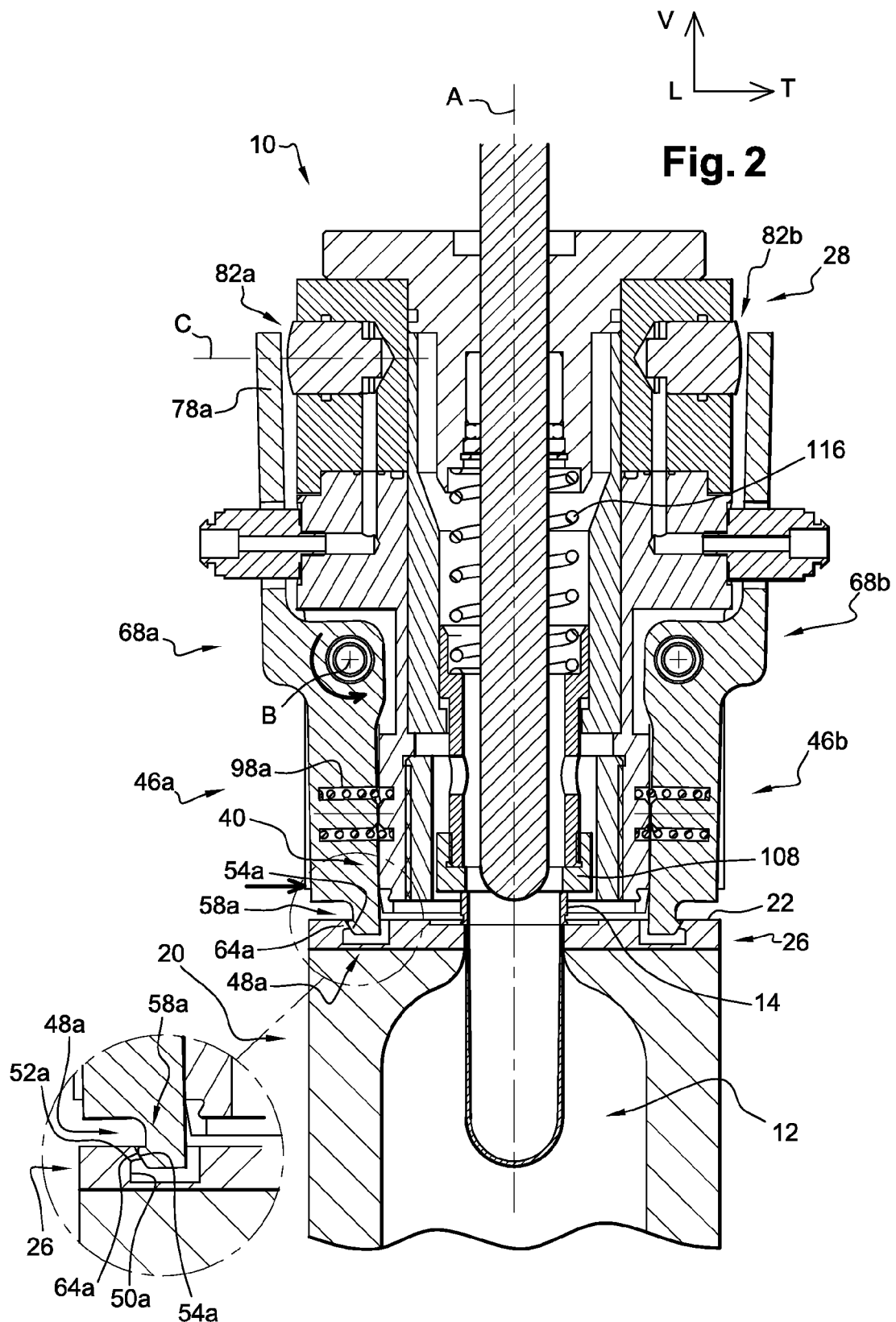
FIG. 2 is a similar view to that of FIG. 1, showing, for each lock, a male element forming a bolt and a female element forming a strike during the automatic locking of the lock, when the nozzle is driven to its lowered blowing position.

Thus, when pressurized air is injected into the chamber 86a via the feed duct 88a, the piston 82a is driven slidingly from a free position shown in FIGS. 1 to 3, in which the piston 82a is retracted in its sleeve 80a, to a working position shown in FIG. 4, in which the piston 82a is at least partly emerged from the sleeve 80a.

During its movement towards its working position, the piston 82a slides transversally towards the lever 68a under the effect of the pressurized air injected into the chamber 86a, the piston 82a then applying a pivoting driving force on the upper section 78a of the lever 68a.

The blow-moulding installation 10 comprises a control device (not shown) for the piston 82a, which is suitable for selectively controlling the injection of air into the chamber 86a to control the movement of the piston 82a towards its working position.

The pivoting driving force exerted by the upper section 78a of the lever 68a by the piston 82a, causes the pivoting of the lever 68a about its longitudinal pivoting axis B, so that, when the nozzle 28 occupies its lowered blowing position, the bolt 58a is released, that is driven from its nozzle 28 locking position to its nozzle 28 unlocking position, as shown in FIG. 4.

Moreover, the nozzle 28 comprises a helical spring 98a forming a first means for returning the bolt 58a to its locking position, the first return means acting for this purpose against the pivoting of the lever 68a.

The helical spring 98a extends transversally from a first end which is accommodated in a first annular groove 100a formed in the peripheral face 45 of the body 30 of the nozzle 28, to a second end which is accommodated in a second annular groove 102a formed in the lower length 76a of the first lever 68a.

Thus, the helical spring 98a is transversally inserted between the outer face of the body 30 of the nozzle 28, in order to apply an elastic return force to the lever 68a, to elastically return the bolt 58a to its locking position.

Advantageously, the helical spring 98a is dimensioned to is exert a sufficient return force to make the piston 82a slide from its working position to its retracted position, when the piston 82a is no longer controlled in its working position by the associated control device.

The locking and unlocking of the nozzle 28 to and from the mould 20, during a blowing cycle of a blank 12, is shown and broken down chronologically in FIGS. 1 to 4.

As shown in FIG. 1, the nozzle 28 is driven slidingly downwards along axis A from a raised rest position, to its lowered blowing position.

In FIG. 2, during the vertical sliding of the nozzle 28 towards its lowered blowing position, the actuating surface 64a of the bolt 58a cooperates slidingly against the matching control surface 54a of the detent 52a of the strike 48a, so that the bolt 58a is driven, or loaded, momentarily towards its locking position against the helical return spring 98a.

Then, as shown in FIG. 3, when the bolt 58a is sufficiently lowered to "pass" the detent 52a, and ceases to cooperate with the detent 52a, the actuating surface 64a of the bolt 58a is no longer in contact against the control surface 54a of the detent 52a of the strike 48a, so that the helical spring 98a is released, thereby causing the automatic engagement of the bolt 58a in its locking position in the strike 48a.

Thus, the automatic locking of at least the first lock 46a of the locking device 46 is obtained simultaneously with the arrival, of the nozzle 28, in its lowered blowing position.

Accordingly, the nozzle 28 occupies its lowered blowing position in which the nozzle 28 is locked to the mould 20, that is the nozzle 28 and the mould 20 are joined together by the means of the locking device 46, the nozzle 28 is suitable for injecting pressurized air into the blank 12 housed in the mould 20 without the said pressurized injection causing their separation, nor affecting the tightness produced by the sealing means 44.

Finally, as shown in FIG. 4, the piston 82a is controlled in movement, from its free position, to its working position, so that the piston 82a exerts a pivoting driving force on the upper section 78a of the lever 68a, whereby the lever 68a is driven pivotingly about its pivoting axis B, to drive the bolt 58a from its nozzle 28 locking position to its nozzle 28 unlocking position.

Thanks to the invention, the nozzle 28 is automatically locked as soon as it reaches its lowered blowing position.

Thus, the bolt 58a of the lock 46a does not need to be controlled in movement towards its locking position, thanks to which the container blow-moulding cycle time is shortened.

Moreover, the bolt 58a is not controlled in its locking position, thereby serving to save energy in comparison with the locking devices of the prior art.

According to another aspect, the blow-moulding installation 10 comprises means 104 for positioning the neck 14 of the blank 12, to prevent the neck from being arranged across the opening 24 of the mould 20.

In fact, when the blank 12 is introduced into the mould 20, the blank 12 is liable to rebound on the upper face 22 of the mould 20 and thereby tends to be misaligned.

The positioning means 104 is described in detail in document FR-A-2912678.

The positioning means 104 comprises a cylindrical insert 106 which extends vertically into the well 36 of the nozzle 28, along the vertical sliding axis A of the nozzle 28, about the drawing rod 38.

As shown in FIG. 1, the lower section of the insert 106 comprises, at its free end, an annular support collar 108 which is arranged opposite the neck 14 of the blank 12.

Moreover, the upper section of the insert 106 bounds a shoulder 110 which projects radially and which bears vertically is downward on a matching annular seat 112 of the well 32 of the nozzle 28.

Similarly, the upper section of the insert 106 bounds a spot facing 114 which extends radially about the axis A, inside the insert 106.

Finally, the positioning means 104 comprises a vertical helical spring 116 having axis A, which is vertically inserted between the plug 34 and the insert 106.

The helical spring 116 comprises an upper end which is accommodated in an annular lower groove 118 of the plug 34, up to a lower end which bears vertically against the spot facing 114 of the insert 106.

The insert 106 is mounted sliding vertically along the axis A in the well 32, and partly in the bell 40 of the nozzle 28, between a low rest position shown in FIG. 1, in which the shoulder 110 of the insert 106 bears vertically against the seat 112 of the nozzle 28 forming a stop, and a high position, in which the shoulder 110 of the insert 106 is vertically spaced from the seat 112 of the nozzle 28, so that the helical spring 116 is compressed.

Upon leaving the furnace, the blank 12 is conveyed directly above the opening 24 and is then introduced into the mould 20.

The nozzle 28 descends rapidly to the low position in which it is pressed against the mould 20 for the blow-moulding operation.

On the assumption that the blank rebounds on the mould 20, its neck 14 strikes the support collar 108 of the insert 106, as to shown in FIG. 2.

Part of the impact energy is absorbed by the compression of the spring 116 and the simultaneous retreat of the insert 106, which thereby acts like a shock absorber with regard to the blank 12 and presses the blank against the upper face 22 of the mould 20.

Moreover, when the nozzle 28 occupies its low blowing position, the insert 106 occupies its high nozzle 28 return position, the helical spring 116 then exerts a vertical upward force on the nozzle 28, whereby the horizontal upper face 66*a* of the bolt 58*a* is pressed elastically against the locking face 56*a* of the detent 52*a* of the first strike 48*a*, so that the bolt 58*a* is locked without vertical clearance on the strike 48*a*.

By symmetry about the general plane of symmetry passing through the axis A, the blow-moulding installation 10 comprises a locking device 46 which is equipped with a second lock 46*b* for automatically locking the nozzle 28 to the mould 20, and which is identical to the first lock 46*a* described above.

The second lock 46*b* is arranged symmetrically with the first lock 46*a*, and it comprises identical elements which are denoted by the same references and the subscript "b".

The blow-moulding installation 10 described above is intended in particular for fabricating a container from a blank 12 called "small" blank.

Figure 6:
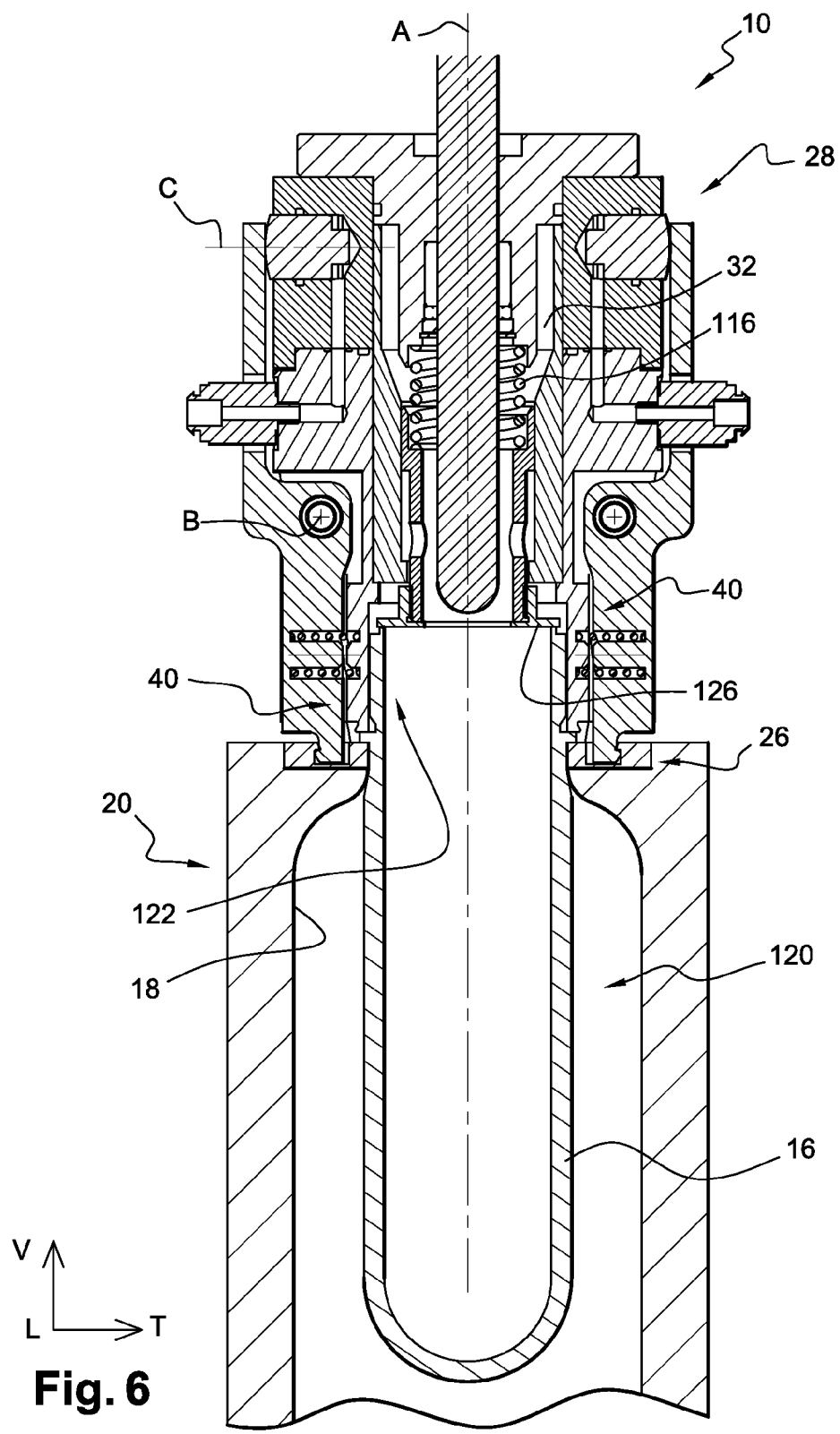
FIG. 6 is a similar view to that of FIG. 1, showing an alternative embodiment of the blow-moulding installation of FIG. 1, which is suitable for blow-moulding a large blank.

However, according to a first alternative embodiment shown in FIG. 6, the blow-moulding installation 10 can be substantially transformed to be adapted to fabricate a container from a blank 120 called "a large" blank, that is a blank that comprises a higher neck 122 having a larger diameter than the neck 14 of the blank 12 called small blank.

For this purpose, as shown in FIG. 1, the bell 40 of the nozzle 28 comprises a threaded movable bush 124 which is screwed to the inside cylindrical wall of the bell 40, and which is suitable for being unscrewed so that the bell 40 can cap the neck 122 of the large blank 120.

Moreover, the collar 108, which is arranged at the free end of the lower section of the insert 106, is screwed to the insert 106, whereby it is possible to replace the collar 108 by another collar is of different size, for example by a collar 126 called "large" as shown in FIG. 6.

Thus, the large collar 126 is suitable for bearing vertically against the neck 122 of the large blank 120, so as to press the blank 120 against the upper face of the mould 20.

According to an alternative not shown, the body 30 of the nozzle 28 comprises an additional air feed duct, which extends into the body 30, from a transverse plane about the axis A of the nozzle 28, and which connects the feed duct 88*a* to the chamber 86*b* of the second piston 82*b*, whereby it is possible to eliminate a coupling, for example the second coupling 96*b*.

The additional feed duct is, for example, a groove that is vertically inserted between the lower portion 31 and the upper portion 33 of the body 30 of the nozzle 28.

According to another alternative embodiment not shown, the nozzle 28 comprises a feed duct which extends from the sleeve 80*a* of the piston 82*a*, to the well 32 of the nozzle 28, so that the pressurized fluid intended to cause the sliding of the piston 82*a* consists of the pressurized fluid which is conveyed by the nozzle 28 for blow-moulding the blank 12.

According to this alternative, the piston 82*a* slides from its rest position to its working position when the fluid pressure in the sleeve 80*a* is higher than a threshold pressure value.

The threshold pressure value is reached when the blow-moulding of the blank 12 is completed, the pressurized fluid conveyed into the nozzle 28 then creating an overpressure in the nozzle 28.

The feed duct is dimensioned so that the threshold pressure value is reached when the overpressure is created in the nozzle 28.

Obviously, the invention is not at all limited to a blow-moulding installation having a bell nozzle, shown and described is exclusively as a non-limiting example, so that the invention is also suitable for being implemented in a blow-moulding installation comprising a "conventional" nozzle, whereof the free end is inserted into or placed on the neck of the blank.

It must also be understood that simple mechanical inversions can constitute alternative embodiments of the invention.

For example, the strike 48*a* of the first lock 46*a* can be made in the nozzle 28, and the bolt 58*a* can be mounted movably on the mould 20.

Moreover, the lock 46*a* can be an added element on the mould 20, for example an upside-down U pin, of which the branches extend vertically from the upper face 22 of the mould 20.

The invention claimed is:

1. Blow-moulding installation (10) for the fabrication of a container from a blank (12), the installation comprising:
   a mould (20) which bounds an internal moulding cavity (18) in which the blank (12) can be arranged in such a way that an upper neck (14) of the blank (12) emerges from the cavity (18) of the mould (20),
   a blowing nozzle (28) which is movably mounted between a rest position in which the nozzle (28) is arranged above the neck (14) of the blank (12), and a blowing position in which the nozzle (28) capping the mould (20) is suitable for conveying a pressurized fluid into the blank (12), and
   a locking device (46) which comprises at least one means (46*a*) for locking the nozzle (28) and the mould (20) in the said blowing position, the locking means (46*a*) comprising at least one female element (48*a*) carried by the mould (20) and at least one male locking element (58*a*) which, joined to the nozzle (28), is movably mounted between:
- a locking position in which the male element (58*a*) cooperates with the female element (48*a*) to lock the nozzle (28) to the mould (20) in its blowing position, and
- an unlocking position in which the male element (58*a*) is released from the female element (48*a*) to allow the nozzle (28) to return to its rest position, characterized in that the locking means (46*a*) comprises a first means (98*a*) for returning the male element (58*a*) to its locking position, and in that the male element (58*a*) comprises an actuating surface (64*a*) which, during the movement of the nozzle (28) towards its blowing position, cooperates with a matching control surface (54*a*) joined to the mould (20) in order to mechanically force the male element (58*a*) towards its locking position against the first return means (98*a*), the said male element (58*a*) being returned automatically to its locking position when the nozzle (28) occupies its blowing position.

2. Blow-moulding installation (10) according to claim 1, characterized in that the locking means (46*a*) comprises an actuating means (82*a*) which is suitable for driving the male element (58*a*) from its locking position to its unlocking position, against the first return means (98*a*).

3. Blow-moulding installation (10) according to claim 2, characterized in that the locking means (46*a*) is equipped with a lever (68*a*) which extends roughly vertically and which comprises:
- a central section (70*a*) which is pivotingly mounted on the nozzle (28) about a horizontal axis (B) perpendicular to the axis (A) of movement of the nozzle (28),
- a lower section (76*a*) at the end of which the male element (58*a*) is arranged,
- an upper section (78*a*) on which the said actuating means (82*a*) acts to pivot the lever (68*a*), in order to drive the male element (58*a*) from its locking position to its unlocking position.

4. Blow-moulding installation (10) according to claim 3, characterized in that the first return means (98*a*) of the male element (58*a*) comprises a first spring (98*a*) which is inserted between the nozzle (28) and the lower section (76*a*) of the lever (68*a*), in order to apply an elastic return force to the lever (68*a*) to elastically return the male element (58*a*) to its locking position.

5. Blow-moulding installation (10) according to claim 3, characterized in that the actuating means (82*a*) is a piston (82*a*) which, under the effect of a pressurized fluid, slides along a horizontal axis (C) perpendicular to the pivoting axis (B) of the lever (68*a*) between:
- a first free position in which the piston (82*a*) is retracted, so that the male element (58*a*) is forced into its locking position by the first return means (98*a*), and
- a second working position in which the piston (82*a*) applies a driving force to the lever (68*a*), so that the male element (58*a*) is driven into its unlocking position by the pivoting of the lever (68*a*) against the first return means (98*a*).

6. Blow-moulding installation (10) according to claim 5, characterized in that the nozzle (28) comprises a feed duct which extends from the sleeve (80*a*) of the piston (82*a*), to the well (32) of the nozzle (28), so that the pressurized fluid for causing the piston (82*a*) to slide consists of the pressurized fluid which is conveyed by the nozzle (28) for blow-moulding the blank (12).

7. Blow-moulding installation (10) according to claim 6, characterized in that the piston (82*a*) slides from its first rest position towards its second working position when the pressure of the fluid in the sleeve (80*a*) is higher than a threshold pressure value and in that the said threshold pressure value is reached when, the blow-moulding of the blank (12) being completed, the pressurized fluid conveyed into the nozzle (28) causes an overpressure therein.

8. Blow-moulding installation (10) according to claim 5, characterized in that to supply the actuating means (82*a*) with pressurized fluid, the nozzle (28) comprises a pressurized fluid feed duct (88*a*), which extends from an inlet orifice (90*a*) arranged in a peripheral face (45) of the nozzle (58*a*) to a sleeve (80*a*), which is bounded by the nozzle (28) and in which the piston (82*a*) is slidingly mounted.

9. Blow-moulding installation (10) according to claim 8, characterized in that the upper section (78*a*) of the lever (68*a*) bounds an opening (94*a*) through which a horizontal coupling (96*a*) extends, whereof a first end is connected to the inlet orifice (90*a*) of the feed duct (88*a*), and a second opposite end is suitable for being connected to an external source of pressurized fluid.

10. Blow-moulding installation (10) according to claim 1, characterized in that it comprises an insert (106) which is vertically and slidingly mounted in the nozzle (28) between a low position towards which the insert (106) is elastically returned by a return means (116), and a high position in which the insert (106) bears against the neck (14) of the blank (12), against the return means (116), to prevent the neck (14) from being arranged across the opening (24) of the mould (20).

11. Blow-moulding installation (10) according to claim 10, characterized in that the combination formed by the insert (106) and the return means (116) constitutes a means of elastic return of the nozzle (28) from its lowered blowing position to its raised rest position.

12. Blow-moulding installation (10) according to claim 1, characterized in that the installation (10) comprises a vertical median plane of symmetry passing through the vertical axis (A) of movement of the nozzle (28), so that the installation (10) comprises at least two locking means (46*a*, 46*b*) which are arranged symmetrically about the said plane.

\* \* \* \* \*